(12) United States Patent
Kito

(10) Patent No.: US 12,371,555 B2
(45) Date of Patent: Jul. 29, 2025

(54) VIBRATION ABSORBING MATERIAL

(71) Applicant: TOYOTA BOSHOKU KABUSHIKI KAISHA, Aichi (JP)

(72) Inventor: Masayuki Kito, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 661 days.

(21) Appl. No.: 17/417,641

(22) PCT Filed: Dec. 11, 2019

(86) PCT No.: PCT/JP2019/048570
§ 371 (c)(1),
(2) Date: Jun. 23, 2021

(87) PCT Pub. No.: WO2020/145013
PCT Pub. Date: Jul. 16, 2020

(65) Prior Publication Data
US 2022/0106473 A1    Apr. 7, 2022

(30) Foreign Application Priority Data
Jan. 9, 2019    (JP) ................................ 2019-002226

(51) Int. Cl.
*C08L 23/12*    (2006.01)
*B60R 13/08*    (2006.01)
*C08L 77/02*    (2006.01)

(52) U.S. Cl.
CPC ............. *C08L 23/12* (2013.01); *B60R 13/08* (2013.01); *C08L 77/02* (2013.01); *C08L 2205/025* (2013.01); *C08L 2205/035* (2013.01); *C08L 2205/22* (2013.01)

(58) Field of Classification Search
CPC .............. B60R 13/08; C08L 2205/025; C08L 2205/03; C08L 2205/05; C08L 51/003; C08L 51/006; C08L 51/04; C08L 51/06; C08L 77/00–10; C08L 2205/035; C08L 2205/22; C08L 23/12; F16F 1/3605
See application file for complete search history.

(56) References Cited

U.S. PATENT DOCUMENTS

| | | | |
|---|---|---|---|
| 9,068,066 | B2 | 6/2015 | Oriani |
| 9,249,300 | B2 | 2/2016 | Kawada et al. |
| 9,493,642 | B2 | 11/2016 | Kito et al. |
| 9,840,615 | B2 | 12/2017 | Kito et al. |
| 2014/0155537 | A1 | 6/2014 | Oriani |
| 2014/0371394 | A1 | 12/2014 | Kito et al. |
| 2015/0218373 | A1 | 8/2015 | Kawada et al. |
| 2017/0029610 | A1 | 2/2017 | Kito et al. |
| 2018/0334560 | A1 | 11/2018 | Kito et al. |
| 2019/0382569 | A1 | 12/2019 | Kato |
| 2020/0157291 | A1 | 5/2020 | Kito et al. |

FOREIGN PATENT DOCUMENTS

| | | | |
|---|---|---|---|
| JP | 02-58552 | | 2/1990 |
| JP | 03-138830 | | 6/1991 |
| JP | 08-152890 | | 6/1996 |
| JP | 2005-003019 | | 1/2005 |
| JP | 2009-007446 | | 1/2009 |
| JP | 2010-6953 | | 1/2010 |
| JP | 2013-147645 | | 8/2013 |
| JP | 2014-001343 | | 1/2014 |
| JP | 2014-025060 | A | 2/2014 |
| JP | 2015-537097 | | 12/2015 |
| JP | 2017-052830 | | 3/2017 |
| JP | 2018-135486 | | 8/2018 |
| JP | 2018-178036 | | 11/2018 |
| WO | 2018/139379 | | 8/2018 |
| WO | WO-2018193923 | A1 * | 10/2018 ................ C08J 5/00 |

OTHER PUBLICATIONS

Office Action issued in the corresponding German Patent Application No. 11 2019 006 611.0, dated Feb. 24, 2023, along with English translation thereof.
Office Action issued in the corresponding Japanese Application No. 2020-565645 dated Jun. 13, 2023, along with the English translation.
Office Action issued to corresponding Patent Chinese Application No. 201980088216.9 dated Mar. 18, 2023, along with the English translation.
Official Communication issued in International Patent Application No. PCT/JP2019/048570, dated Mar. 10, 2020, along with English-language translation.
Office Action issued in corresponding German App. No. 112019006611.0 dated Oct. 22, 2021, along with English translation.

* cited by examiner

*Primary Examiner* — Ana L. Woodward
(74) *Attorney, Agent, or Firm* — GREENBLUM & BERNSTEIN, P.L.C.

(57) ABSTRACT

A vibration absorbing material contains a polyolefin resin, a polyamide resin, and a modified elastomer having a reactive group that reacts with the polyamide resin. When the total of the polyolefin resin, the polyamide resin and the modified elastomer is 100% by mass, the proportion of the polyolefin resin is 10% by mass or more and 90% by mass or less, the proportion of the polyamide resin is 3% by mass or more and 85% by mass or less, and the proportion of the modified elastomer is 3% by mass or more and 35% by mass or less. The vibration absorbing material contains a thermoplastic resin including a continuous phase (A) containing the polyolefin resin and a dispersed phase (B) dispersed in the continuous phase (A) and containing the polyamide resin.

5 Claims, 2 Drawing Sheets

VIBRATION ABSORBING MATERIAL

TECHNICAL FIELD

The present invention relates to a vibration absorbing material. More specifically, the present invention relates to a vibration absorbing material which is a molding material having a certain mechanical strength as a structural material, and which exhibits excellent vibration absorbing ability by itself as a molding material containing a thermoplastic resin.

BACKGROUND ART

In recent years, much attention has been paid to vibration damping and soundproofing from the viewpoint of comfort in the fields of home electric appliances or automobiles related to daily life. In the field of home electric appliances, an electric appliance equipped with a drive device such as a motor is a vibration source. Further, in the field of automobiles, a drive system device such as a roof, a door, or an engine of a vehicle that vibrates slightly during traveling is a vibration source. The vibration generated from the vibration source reaches humans as noise through the air via a structural material of an electric appliance that houses the vibration source therein, an interior/exterior material for an automobile, the panel material, and the like. Therefore, vibration absorbing materials such as vibration-proof rubber and vibration-proof sheets are attached to vibration absorbed materials in which vibration damping is expected, such as structural materials for electric appliances, interior/exterior materials for automobiles, and panel materials, as a means for reducing the noise propagating through the vibration of the vibration absorbed materials.

Specifically, a method is known in which a vibration-proof sheet is interposed between an interior/exterior material for an automobile and a body to be attached to the interior/exterior material, and they are integrated to absorb vibration. Patent Literatures 1 and 2 disclose a composite material type vibration damping material or sound absorbing material in which materials having different properties are laminated. Patent Literature 3 discloses a propylene resin composition having an improved balance between impact resistance at a low temperature and rigidity at a high temperature.

CITATIONS LIST

Patent Literature

Patent Literature 1: JP 2005-003019 A
Patent Literature 2: JP H08-152890 A
Patent Literature 3: JP 2014-001343 A

SUMMARY OF INVENTION

Technical Problems

However, the work of attaching the vibration absorbing material to the interior/exterior material (vibration absorbed material) impairs the productivity of the automobile.

In particular, when the structural material is required to be lightweight, a synthetic resin is often used as the structural material for forming the vibration absorbed material. Structural materials made of synthetic resin are required not to be easily deformed by an external force and to have a certain mechanical strength. On the other hand, a rubber material, which is a typical vibration absorbing material, has excellent vibration absorbing performance but a low mechanical strength (rigidity) in that the elastic modulus is small, and is not suitable for use as a structural material. Therefore, there is an actual situation that it is inevitably necessary to prepare the vibration absorbing material and the vibration absorbed material separately and attach the vibration absorbing material (vibration-proof rubber) to the vibration absorbed material (interior/exterior material).

Patent Literature 1 describes that a vibration damping material has a vibration absorbing action of converting the vibration transmitted from a vibration source into thermal energy by a base sheet containing a synthetic resin as the main component, and further converting it into shear energy at an interface between the base sheet and a metal sheet. Patent Literature 2 describes that a sound absorbing material has a sound absorbing action of forming a mass-spring system in which a high-density layer made of synthetic resin fibers is a mass part and a low-density layer is a spring part, and attenuating sound energy. The composite material type damping material or sound absorbing material impairs productivity in the same manner as described above in that the material made of a synthetic resin or synthetic resin fibers of the same quality does not exert the vibration damping or sound absorbing effect by itself.

Therefore, development of a more convenient vibration absorbing material that is molded using a lightweight synthetic resin, has a certain mechanical strength as a structural material, and exhibits excellent vibration absorbing ability as a single material is desired. Patent Literature 3 discloses that a propylene resin composition, preferably a propylene-based block copolymer, is a molding material that exhibits a good balance of impact resistance and rigidity.

The present invention has been made in view of the above circumstances, and an object thereof is to provide a vibration absorbing material which is a molding material having a certain mechanical strength as a structural material, and which exhibits excellent vibration absorbing ability by itself as a molding material containing a thermoplastic resin.

Solutions to Problems

That is, the present invention provides the following.

A vibration absorbing material according to claim 1 contains a polyolefin resin, a polyamide resin, and a modified elastomer having a reactive group that reacts with the polyamide resin.

When a total of the polyolefin resin, the polyamide resin and the modified elastomer is 100% by mass, a proportion of the polyolefin resin is 10% by mass or more and 90% by mass or less, a proportion of the polyamide resin is 3% by mass or more and 85% by mass or less, and a proportion of the modified elastomer is 3% by mass or more and 35% by mass or less.

The vibration absorbing material contains a thermoplastic resin including a continuous phase (A) containing the polyolefin resin and a dispersed phase (B) dispersed in the continuous phase (A) and containing the polyamide resin.

A vibration absorbing material according to claim 2 is the vibration absorbing material according to claim 1 wherein the dispersed phase (B) has a continuous phase (Ba) in the dispersed phase containing the polyamide resin, and a fine dispersed phase (Bb) dispersed in the continuous phase (Ba) in the dispersed phase and containing the modified elastomer.

A vibration absorbing material according to claim 3 is the vibration absorbing material according to claim 2, wherein an average dispersion diameter of the dispersed phase (B) is 100 nm or more and 4000 nm or less, and an average dispersion diameter of the fine dispersed phase (Bb) is 15 nm or more and 350 nm or less.

A vibration absorbing material according to claim 4 is the vibration absorbing material according to any one of claims 1 to 3, wherein, in addition to the continuous phase (A), the thermoplastic resin includes a second continuous phase (A2) coexisting with the continuous phase (A) and comprising the polyamide resin, and wherein the second continuous phase (A2) has a second dispersed phase (B2) dispersed in the second continuous phase (A2) and comprising the modified elastomer.

A vibration absorbing material according to any one of claims 1 to 4, which is used as an interior/exterior material for an automobile.

A vibration absorbing material according to any one of claims 1 to 4, containing a mixed resin obtained by further adding a polyolefin resin to the thermoplastic resin.

Advantageous Effects of Invention

The vibration absorbing material according to the present invention is a molding material having a certain mechanical strength as a structural material, and can exhibit excellent vibration absorbing ability by itself as a molding material containing a thermoplastic resin.

That is, the thermoplastic resin constituting the vibration absorbing material according to the present invention is excellent in use as a vibration absorbing material. It can be effectively used as a vibration absorbing material.

DESCRIPTION OF EMBODIMENTS

Figure 1:
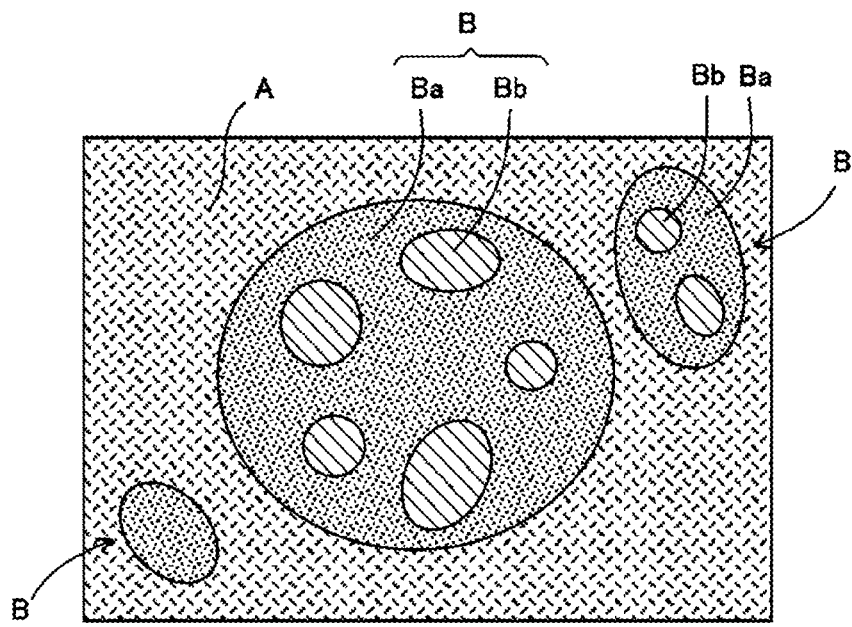
FIG. 1 is a schematic diagram for explaining an example of a phase structure of a thermoplastic resin contained in a vibration absorbing material according to the present invention.

The particulars shown herein are by way of example and for the purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for a fundamental understanding of the present invention, and the description taken with the drawings makes apparent to those skilled in the art how the several forms of the present invention may be embodied in practice.

A vibration absorbing material according to the present invention contains a polyolefin resin, a polyamide resin, and a modified elastomer having a reactive group that reacts with the polyamide resin. When the total of the polyolefin resin, the polyamide resin and the modified elastomer is 100% by mass, the proportion of the polyolefin resin is 10% by mass or more and 90% by mass or less, the proportion of the polyamide resin is 3% by mass or more and 85% by mass or less, and the proportion of the modified elastomer is 3% by mass or more and 35% by mass or less. The vibration absorbing material contains a thermoplastic resin including a continuous phase (A) containing the polyolefin resin and a dispersed phase (B) dispersed in the continuous phase (A) and containing the polyamide resin.

Further, the vibration absorbing material of the present invention sets vibrations in a frequency range of about 20 Hz to 20 kHz, which is considered to be a human audible band, as target vibrations to be absorbed.

The vibration absorbing material of the present invention preferably has not only vibration absorbing performance but also suitability as a structural material, when a structural material is formed using the thermoplastic resin.

That is, it preferably has mechanical properties such as rigidity and impact resistance, fatigue resistance, moldability, and the like. In this regard, the present inventors have developed a thermoplastic resin containing a polyolefin resin, a polyamide resin, and a modified elastomer having a reactive group that reacts with the polyamide resin. Further, the present inventors have disclosed the thermoplastic resin having excellent mechanical properties in JP 2013-147645 A, JP 2013-147646 A, JP 2013-147647 A, JP 2013-147648 A and the like. Further, the present inventors have disclosed the thermoplastic resin having excellent fatigue resistance in WO2018/193923 and the thermoplastic fibers having excellent tensile properties as a fiber material in JP 2018-123457 A.

However, nothing has been known about the vibration absorption performance of various molding materials using such a thermoplastic resin. As a result of further studies, the present inventors have found that a molding material having excellent vibration absorption performance corresponding to frequencies in the human audible band can be obtained by using the above-described thermoplastic resin. The present inventors have found that molding materials containing the thermoplastic resin can reduce the noise that reaches humans without the need for special man-hours such as separately attaching vibration-proof rubber or laminating any other material.

(Thermoplastic Resin)

The thermoplastic resin composition contained in the vibration absorbing material according to the present invention contains a polyolefin resin, a polyamide resin, and a modified elastomer having a reactive group that reacts with the polyamide resin. The details of the individual components are the same as those disclosed in JP 2013-147645 A, JP 2013-147646 A, JP 2013-147647 A, JP 2013-147648 A and the like, and the following is a confirmatory explanation.

<1> Polyolefin Resin

The polyolefin resin may be an olefin homopolymer and/or an olefin copolymer.

The olefin is not particularly limited, and examples thereof include ethylene, propylene, and an α-olefin having 4 to 8 carbon atoms. Examples of the α-olefin having 4 to 8 carbon atoms include 1-butene, 3-methyl-1-butene, 1-pentene, 3-methyl-1-pentene, 4-methyl-1-pentene, 1-hexene, and 1-octene. These molding methods may be used singly or in combination of two or more of them.

Specific examples of the polyolefin resin include a polyethylene resin, a polypropylene resin, poly-1-butene, poly-1-hexene, and poly-4-methyl-1-pentene. These polymers may be used singly or in combination of two or more of them. That is, the polyolefin resin may be a mixture of two or more of the above polymers.

Examples of the polyethylene resin include an ethylene homopolymer and a copolymer of ethylene and another olefin (except for ethylene). Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin (except for propylene). Examples of the latter include a propylene-ethylene copolymer and a propylene-1-butene copolymer (the content of a propylene-derived structural unit is 50% or more of the total structural units).

Further, the copolymer of propylene and another olefin may be a random copolymer or a block copolymer. Among them, a block copolymer is preferred in terms of excellent mechanical strength. Particularly, a propylene-ethylene block copolymer having ethylene as another olefin is preferred. Such a propylene-ethylene block copolymer is also called, for example, an impact copolymer, a polypropylene impact copolymer, a heterophasic polypropylene, or a heterophasic block polypropylene.

The weight-average molecular weight (based on polystyrene standards) of the polyolefin resin measured by gel permeation chromatography (GPC) is not particularly limited, and may be, for example, 10,000 or more and 500,000 or less, but is preferably 100,000 or more and 450,000 or less, more preferably 200,000 or more and 400,000 or less. It is to be noted that the polyolefin resin is a polyolefin that has no affinity for the polyamide resin that will be described later, and that has no reactive group capable of reacting with the polyamide resin, either. In this point, the polyolefin resin is different from an olefin-based component as the modified elastomer that will be describe later.

<2> Polyamide Resin

The polyamide resin is a polymer obtained by polymerizing a plurality of monomers via amide bonds (—NH—CO—).

Examples of a monomer constituting the polyamide resin include amino acids such as 6-aminocaproic acid, 11-aminoundecanoic acid, 12-aminododecanoic acid, and para-aminomethyl benzoic acid, and lactams such as ε-caprolactam, undecane lactam, and ω-lauryl lactam. These molding methods may be used singly or in combination of two or more of them.

The polyamide resin can be obtained also by copolymerization of a diamine and a dicarboxylic acid. In this case, examples of the diamine as a monomer include: aliphatic diamines such as ethylene diamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexane diamine and bis-(4-aminocyclohexyl)methane; and aromatic diamines such as xylylene diamines (e.g., p-phenylenediamine and m-phenylenediamine). These molding methods may be used singly or in combination of two or more of them.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, terephthalic acid, isophthalic acid, and naphthalenedicarboxylic acid. These molding methods may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamide resins may be used singly or in combination of two or more of them.

Further, in the present invention, among the above-described various polyamide resins, one derived from a plant may be used. A plant-derived polyamide resin is preferred from the viewpoint of environmental protection (particularly from the viewpoint of carbon neutral) because it uses a monomer derived from a plant-derived component such as a vegetable oil.

Examples of the plant-derived polyamide resin include polyamide 11, polyamide 610, polyamide 612, polyamide 614, polyamide 1010, polyamide 1012, and polyamide 10T. These molding methods may be used singly or in combination of two or more of them.

Among the above plant-derived polyamide resins, polyamide 11 is superior to the other plant-derived polyamide resins in terms of low water absorbability, low specific gravity, and high biomass degree. Polyamide 610 is inferior to polyamide 11 in water absorption rate, chemical resistance, and impact strength, but is excellent in heat resistance (melting point) and strength. Further, polyamide 610 is superior to polyamide 6 or polyamide 66 in terms of low water absorbability and size stability, and therefore can be used as an alternative to polyamide 6 or polyamide 66. Polyamide 1010 is superior to polyamide 11 in heat resistance and strength. Further, polyamide 1010 is comparable in biomass degree to polyamide 11, and therefore can be used for parts required to have higher durability. Polyamide 10T contains an aromatic ring in its molecular skeleton, and therefore has a higher melting point and higher strength than polyamide 1010. Therefore, polyamide 10T makes it possible to use the vibration absorbing material in a harsher environment.

The weight-average molecular weight (based on polystyrene standards) of the polyamide resin measured by gel permeation chromatography (GPC) is not particularly limited, and may be, for example, 5,000 or more and 100,000 or less, but is preferably 7,500 or more and 50,000 or less, more preferably 10,000 or more and 50,000 or less.

<3> Modified Elastomer

The modified elastomer is an elastomer having a reactive group that reacts with the polyamide resin. This modified elastomer is preferably a component having an affinity for the polyolefin resin. Namely, this modified elastomer is preferably a component having compatibilizing effect on the polyamide resin and the polyolefin resin. In other words, this modified elastomer is preferably a compatibilizer for the polyamide resin and the polyolefin resin.

Examples of the reactive group include an acid anhydride group (—CO—O—OC—), a carboxyl group (—COOH), an epoxy group {—C$_2$O (a three-membered ring structure composed of two carbon atoms and one oxygen atom)}, an oxazoline group (—C$_3$H$_4$NO), and an isocyanate group (—NCO). These molding methods may be used singly or in combination of two or more of them.

The amount of modification of the modified elastomer is not limited as long as the modified elastomer has one or more reactive groups per molecule. Further, the modified elastomer preferably has 1 or more and 50 or less reactive groups, more preferably has 3 or more and 30 or less reactive groups, particularly preferably has 5 or more and 20 or less reactive groups per molecule.

Examples of the modified elastomer include: a polymer using any monomer capable of introducing a reactive group (a modified elastomer obtained by polymerization using monomers capable of introducing a reactive group); an oxidative degradation product of any polymer (a modified elastomer having a reactive group formed by oxidative degradation); and a graft polymer obtained by graft polymerization of an organic acid on any polymer (a modified elastomer having a reactive group introduced by graft polymerization of an organic acid). These molding methods may be used singly or in combination of two or more of them.

Examples of the monomer capable of introducing a reactive group include a monomer having a polymerizable unsaturated bond and an acid anhydride group, a monomer having a polymerizable unsaturated bond and a carboxyl group, and a monomer having a polymerizable unsaturated bond and an epoxy group.

Specific examples of the monomer capable of introducing a reactive group include: acid anhydrides such as maleic anhydride, itaconic anhydride, succinic anhydride, glutaric anhydride, adipic anhydride, citraconic anhydride, tetrahydrophthalic anhydride, and butenyl succinic anhydride; and carboxylic acids such as maleic acid, itaconic acid, fumaric acid, acrylic acid, and methacrylic acid. These compounds may be used singly or in combination of two or more of them. Among these compounds, acid anhydrides are preferred, maleic anhydride and itaconic anhydride are more preferred, and maleic anhydride is particularly preferred.

The type of resin constituting the skeleton of the modified elastomer (hereinafter referred to as a "skeletal resin") is not particularly limited, and various thermoplastic resins may be used. As the skeletal resin, one or two or more of the above-described various polyolefin resins may be used. Other examples of the skeletal resin include an olefin-based thermoplastic elastomer and a styrene-based thermoplastic elastomer. These molding methods may be used singly or in combination of two or more of them.

The olefin-based thermoplastic elastomer having an olefin skeleton may be a copolymer of two or more olefins.

The olefins may be one or two or more of the various olefins mentioned above as examples of an olefin constituting the polyolefin resin. The olefin-based thermoplastic elastomer is particularly preferably a copolymer of ethylene and an α-olefin having 3 to 8 carbon atoms or a copolymer of propylene and an α-olefin having 4 to 8 carbon atoms.

Examples of the copolymer of ethylene and an α-olefin having 3 to 8 carbon atoms include an ethylene/propylene copolymer (EPR), an ethylene/1-butene copolymer (EBR), an ethylene/1-pentene copolymer, an ethylene/1-hexene copolymer, an ethylene/1-heptene copolymer, and an ethylene/1-octene copolymer (EOR).

Examples of the copolymer of ethylene and an α-olefin having 4 to 8 carbon atoms include a propylene/1-butene copolymer (PBR), a propylene/1-pentene copolymer, a propylene/1-hexene copolymer, a propylene/1-heptene copolymer, and a propylene/1-octene copolymer (POR). These molding methods may be used singly or in combination of two or more of them.

On the other hand, examples of the styrene-based thermoplastic elastomer having a styrene skeleton include a block copolymer of a styrene-based compound and a conjugated diene compound and a hydrogenated product thereof.

Examples of the styrene-based compound include styrene, alkyl styrenes such as α-methyl styrene, p-methyl styrene, and p-t-butyl styrene, p-methoxy styrene, and vinyl naphthalene. These molding methods may be used singly or in combination of two or more of them.

Examples of the conjugated diene compound include butadiene, isoprene, piperylene, methyl pentadiene, phenyl butadiene, 3,4-dimethyl-1,3-hexadiene, and 4,5-diethyl-1,3-octadiene. These molding methods may be used singly or in combination of two or more of them.

Specific examples of the styrene-based thermoplastic elastomer include a styrene-butadiene-styrene copolymer (SBS), a styrene-isoprene-styrene copolymer (SIS), a styrene-ethylene/butylene-styrene copolymer (SEES), and a styrene-ethylene/propylene-styrene copolymer (SEPS). These molding methods may be used singly or in combination of two or more of them. Among them, SEBS is preferred.

The weight-average molecular weight (based on polystyrene standards) of the modified elastomer measured by gel permeation chromatography (GPC) is not particularly limited, and may be, for example, 10,000 or more and 500,000 or less, but is preferably 35,000 or more and 500,000 or less, more preferably 35,000 or more and 300,000 or less.

<4> Other Components

The thermoplastic resin contained in the vibration absorbing material according to the present invention may contain other thermoplastic resins or components in addition to the polyolefin resin, the polyamide resin, and the modified elastomer. Examples of the other components include a filler (reinforcing filler), a nucleating agent, an antioxidant, a thermal stabilizer, a weatherproofer, a light stabilizer, a plasticizer, an ultraviolet absorbing material, an antistatic agent, a flame retardant, a flame retardant aid, a slip agent, an antiblocking agent, an antifog agent, a lubricant, an antimicrobial agent, a colorant (pigment, dye), a disperser, a copper inhibitor, a neutralizer, an anti-foam agent, a weld strength improver, a natural oil, a synthetic oil, and a wax. These molding methods may be used singly or in combination of two or more of them.

Examples of another thermoplastic resin include polyester-based resins (polybutylene terephthalate, polyethylene terephthalate, polycarbonate, polybutylene succinate, polyethylene succinate, and polylactic acid). These molding methods may be used singly or in combination of two or more of them.

Examples of the filler include: glass components (e.g., glass fibers, glass beads, glass flakes); silica; inorganic fibers (glass fibers, alumina fibers, carbon fibers), graphite, silicate compounds (e.g., calcium silicate, aluminum silicate, montmorillonite, kaolin, talc, clay), metal oxides (e.g., iron oxide, titanium oxide, zinc oxide, antimony oxide, alumina), carbonates and sulfates of metals such as lithium, calcium, magnesium, and zinc, metals (e.g., aluminum, iron, silver, copper), hydroxides (e.g., aluminum hydroxide, magnesium hydroxide), sulfides (e.g., barium sulfate), carbides (e.g., wood charcoal, bamboo charcoal), titanides (potassium titanate, barium titanate), organic fibers (e.g., aromatic polyester fibers, aromatic polyamide fibers, fluororesin fibers, polyimide fibers, vegetable fibers), and celluloses (e.g., cellulose microfibrils, cellulose acetate). These molding methods may be used singly or in combination of two or more of them. These fillers can be used also as nucleating agents.

<5> Phase Structure

Preferred phase structures of the thermoplastic resin contained in the vibration absorbing material according to the present invention include the following phase structure (1) and phase structure (2).

Phase structure (1): A structure having a continuous phase (A) containing a polyolefin resin and a dispersed phase (B) dispersed in the continuous phase (A) and containing a polyamide resin and a modified elastomer (see FIG. 1). It is to be noted that the phase structure (1) does not coexist with another phase structure having a continuous phase containing a polyamide resin and a dispersed phase dispersed in the continuous phase.

Phase structure (2): A structure having, in addition to the continuous phase (A), a second continuous phase (A2) coexisting with the continuous phase (A) and containing the polyamide resin, wherein the second continuous phase (A2) has a second dispersed phase (B2) dispersed in the second continuous phase (A2) and containing the modified elastomer (see FIG. 2).

In the phase structure (1), the dispersed phase (B) in the phase structure (1) may further have a continuous phase (Ba) in the dispersed phase, which is present in the dispersed phase (B) and contains the polyamide resin, and a fine dispersed phase (Bb) which is dispersed in the continuous phase (Ba) in the dispersed phase and contains the modified elastomer (see FIG. 1). In this case, the phase structure (1) has a multiple phase structure having a fine dispersed phase (Bb) further dispersed in the dispersed phase (B).

It is to be noted that the modified elastomer present in the phase structure (1) may be an unreacted modified elastomer, a product obtained by reaction with the polyamide resin, or a mixture of them.

The phase structure (2) can be a co-continuous phase structure in which two continuous phases, the continuous phase (A) and the second continuous phase (A2), coexist. Further, the dispersed phase (B) in the continuous phase (A) in the phase structure (2) may have a continuous phase (Ba) in the dispersed phase, which is present in the dispersed phase (B) and contains the polyamide resin, and a fine dispersed phase (Bb) which is dispersed in the continuous phase (Ba) in the dispersed phase and contains the modified elastomer (see FIG. 2). In this case, the phase structure (2) has a multiple phase structure having a fine dispersed phase (Bb) further dispersed in the dispersed phase (B).

It is to be noted that the modified elastomer present in the phase structure (2) may be an unreacted modified elastomer, a product obtained by reaction with the polyamide resin, or a mixture of them.

In the case of the phase structure (1), the continuous phase (A) contains a polyolefin resin. The polyolefin resin is the main component of the continuous phase (A). The ratio of the polyolefin resin is usually 70% by mass or more and may be 100% by mass with respect to the total mass of the continuous phase (A). Further, the dispersed phase (B) contains a polyamide resin and a modified elastomer. The polyamide resin (when the dispersed phase (B) contains a modified elastomer, the polyamide resin and the modified elastomer) is (are) a main component of the dispersed phase (B). The ratio of the polyamide resin (when the dispersed phase (B) contains a modified elastomer, the polyamide resin and the modified elastomer) is usually 70% by mass or more or may be 100% by mass with respect to the total mass of the dispersed phase (B).

When the phase structure (1) is the above-described multiple phase structure, the continuous phase (Ba) in the dispersed phase contains the polyamide resin. The polyamide resin is the main component of the continuous phase (Ba) in the dispersed phase. The ratio of the polyamide resin is usually 70% by mass or more and may be 100% by mass with respect to the total mass of the continuous phase (Ba) in the dispersed phase. The fine dispersed phase (Bb) contains the modified elastomer. The modified elastomer is the main component of the fine dispersed phase (Bb). The ratio of the modified elastomer is usually 70% by mass or more and may be 100% by mass with respect to the total mass of the fine dispersed phase (Bb).

In the case of the phase structure (2), the continuous phase (A) contains a polyolefin resin. The polyolefin resin is the main component of the continuous phase (A). The ratio of the polyolefin resin is usually 70% by mass or more and may be 100% by mass with respect to the total mass of the continuous phase (A). Further, the dispersed phase (B) contains a polyamide resin and a modified elastomer. The polyamide resin and the modified elastomer are the main components of the dispersed phase (B). The ratio of the polyamide resin and the modified elastomer is usually 70% by mass or more and may be 100% by mass with respect to the total mass of the dispersed phase (B).

When the phase structure (2) is the above-described multiple phase structure, the continuous phase (Ba) in the dispersed phase contains the polyamide resin. The polyamide resin is the main component of the continuous phase (Ba) in the dispersed phase. The ratio of the polyamide resin is usually 70% by mass or more and may be 100% by mass with respect to the total mass of the continuous phase (Ba) in the dispersed phase. The fine dispersed phase (Bb) contains the modified elastomer. The modified elastomer is the main component of the fine dispersed phase (Bb). The ratio of the modified elastomer is usually 70% by mass or more and may be 100% by mass with respect to the total mass of the fine dispersed phase (Bb).

The second continuous phase (A2) contains the polyamide resin. The polyamide resin is the main component of the second continuous phase (A2). The ratio of the polyamide resin is usually 70% by mass or more and may be 100% by mass with respect to the total mass of the second continuous phase (A2). The second dispersed phase (B2) dispersed in the second continuous phase (A2) contains the modified elastomer. The modified elastomer is the main component of the second dispersed phase (B2). The ratio of the modified elastomer is usually 70% by mass or more and may be 100% by mass with respect to the total mass of the second dispersed phase (B2).

As will be described later in the Examples, these phase structures can be changed by the blending proportions of the polyolefin resin, the polyamide resin, and the modified elastomer.

It is to be noted that as described above, the thermoplastic resin composition may contain a reaction product obtained by the reaction of the reactive group of the modified elastomer with the polyamide resin. In this case, in the phase structure (1), the reaction product can be present at, for example, the interface between the continuous phase (A) and the dispersed phase (B) and/or the interface between the continuous phase (Ba) in the dispersed phase and the fine dispersed phase (Bb). Similarly, in the phase structure (2), the reaction product can be present at, for example, the interface between the continuous phase (A) and the second continuous phase (A2), the interface between the continuous phase (A) and the dispersed phase (B), and the interface between the continuous phase (Ba) in the dispersed phase and the fine dispersed phase (Bb).

The various phase structures can be observed by observing the treated surface of a test specimen (a test specimen of the vibration absorbing material) subjected to oxygen plasma etching and then to osmium coating with a field-emission scanning electron microscope (FE-SEM). Particularly, the dispersed phase and the fine dispersed phase can be observed in an image enlarged 1000 times or more (usually 10,000 times or less) by such a method. The component constituting each of the phases can be identified by performing energy dispersive X ray spectrometry (EDS) during the observation using the field-emission scanning electron microscope (FE-SEM).

Figure 2:
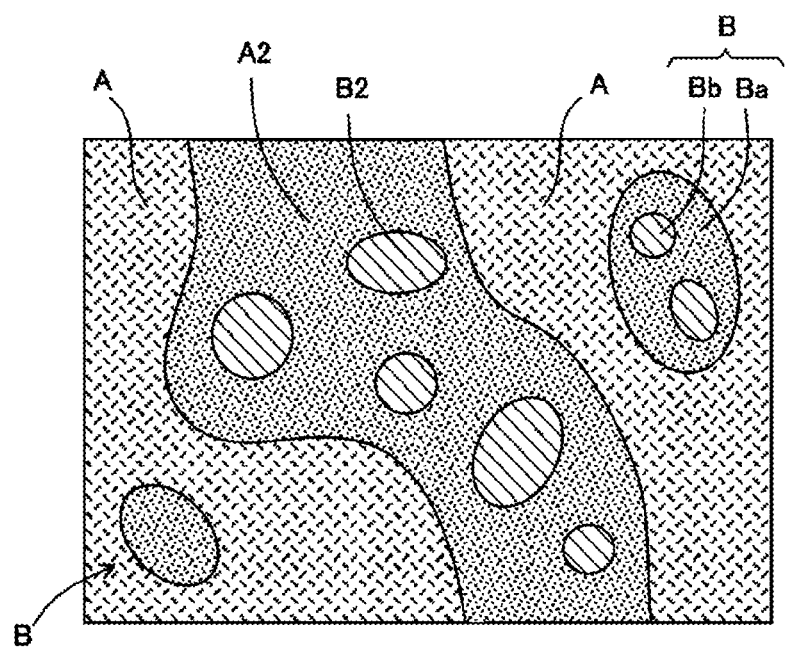
FIG. 2 is a schematic diagram for explaining another example of the phase structure, as in FIG. 1.

The size of the dispersed phase (the dispersed phase (B) shown in FIGS. 1 and 2) of the thermoplastic resin composition contained in the vibration absorbing material according to the present invention is not particularly limited, but the dispersion diameter (average dispersion diameter) of the dispersed phase is preferably 10000 nm or less, more preferably 50 nm or more and 8000 nm or less, even more preferably 100 nm or more and 4000 nm or less.

The dispersion diameter of the dispersed phase can be measured in an electron microscope image enlarged 1000 times or more. More specifically, 20 particles of the dispersed phase are randomly selected in a predetermined area in the image, the largest diameter of each of the particles is measured, and an average of the largest diameters is a first average. Then, first averages measured in 5 different areas in the image are further averaged to determine an average dispersion diameter (major-axis average dispersion diameter) of the dispersed phase.

The size of the fine dispersed phase (fine dispersed phase (Bb) in FIGS. 1 and 2) contained in the dispersed phase (dispersed phase (B) in FIGS. 1 and 2) of the thermoplastic resin composition contained in the vibration absorbing material according to the present invention is not particularly limited. The dispersion diameter (average dispersion diameter) of the fine dispersed phase is preferably 5 nm or more and 1000 nm or less, more preferably 5 nm or more and 600 nm or less, even more preferably 10 nm or more and 400 nm or less, particularly preferably 15 nm or more and 350 nm or less.

The dispersion diameter of the fine dispersed phase can be measured in an electron microscope image enlarged 1000 times or more. More specifically, 20 particles of the fine dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the fine dispersed phase.

<6> Blending of Components

When the total of the polyolefin resin, the polyamide resin, and the modified elastomer in the thermoplastic resin contained in the vibration absorbing material according to the present invention is 100% by mass, the proportion of the polyolefin resin may be 2% by mass or more and 95% by mass or less. The proportion of the polyolefin resin is preferably 5% by mass or more and 92% by mass or less, more preferably 10% by mass or more and 90% by mass or less, even more preferably 15% by mass or more and 85% by mass or less, even more preferably 20% by mass or more and 78% by mass or less, even more preferably 25% by mass or more and 75% by mass or less, even more preferably 30% by mass or more and 73% by mass or less, even more preferably 32% by mass or more and 70% by mass or less. When the polyolefin resin component in the thermoplastic resin is within the above range, it is possible to mold a vibration absorbing material having mechanical strength that achieves both vibration absorption and rigidity.

When the total of the polyolefin resin, the polyamide resin, and the modified elastomer in the thermoplastic resin contained in the vibration absorbing material according to the present invention is 100% by mass, the proportion of the polyamide resin may be 1% by mass or more and 91% by mass or less. The proportion of the polyamide resin is preferably 2% by mass or more and 88% by mass or less, more preferably 3% by mass or more and 85% by mass or less, even more preferably 6% by mass or more and 60% by mass or less, even more preferably 8% by mass or more and 55% by mass or less, even more preferably 10% by mass or more and 50% by mass or less, even more preferably 12% by mass or more and 45% by mass or less, even more preferably 15% by mass or more and 43% by mass or less. When the polyamide resin component in the thermoplastic resin is within the above range, it is possible to mold a vibration absorbing material having mechanical strength that achieves both vibration absorption and rigidity.

When the total of the polyolefin resin, the polyamide resin, and the modified elastomer in the thermoplastic resin contained in the vibration absorbing material according to the present invention is 100% by mass, the proportion of the modified elastomer may be 1% by mass or more and 60% by mass or less. The proportion of the modified elastomer is preferably 2% by mass or more and 55% by mass or less, more preferably 3% by mass or more and 35% by mass or less, even more preferably 6% by mass or more and 34% by mass or less, even more preferably 8% by mass or more and 33% by mass or less, even more preferably 10% by mass or more and 32% by mass or less, even more preferably 12% by mass or more and 31% by mass or less, even more preferably 15% by mass or more and 30% by mass or less. When the modified elastomer component in the thermoplastic resin is within the above range, it is possible to mold a vibration absorbing material having mechanical strength that achieves both vibration absorption and rigidity.

When the total of the polyamide resin and the modified elastomer in the thermoplastic resin composition contained in the vibration absorbing material according to the present invention is 100% by mass, the proportion of the modified elastomer may be 20% by mass or more and 90% by mass or less. The proportion of the modified elastomer is preferably 22% by mass or more and 88% by mass or less, more preferably 25% by mass or more and 86% by mass or less, even more preferably 27% by mass or more and 75% by mass or less, even more preferably 29% by mass or more and 70% by mass or less, even more preferably 32% by mass or more and 66% by mass or less, even more preferably 36% by mass or more and 60% by mass or less. When the modified elastomer component in the dispersed phase of the thermoplastic resin is within the above range, it is possible to mold a vibration absorbing material having mechanical strength that achieves both vibration absorption and rigidity.

<7> Physical Properties

In the vibration absorbing material according to the present invention, it is possible to achieve both impact resistance and rigidity, among other mechanical strengths. Specifically, the impact resistance can be a Charpy impact strength of 50 kJ/m² or more and 150 kJ/m² or less, and the rigidity can be a flexural modulus of 450 MPa or more and 1300 MPa or less as a standard for estimating the rigidity. Furthermore, the impact resistance can be a Charpy impact strength of 60 kJ/m² or more and 140 kJ/m² or less, and the rigidity can be a flexural modulus of 500 MPa or more and 1200 MPa or less, and further can be a Charpy impact strength 70 kJ/m² or more and 130 kJ/m² or less and a flexural modulus of 550 MPa or more and 1100 MPa or less.

It is to be noted that the value of the Charpy impact strength is measured in accordance with JIS K7111-1 (type A notch, temperature: 23° C., edgewise test method). The value of the flexural modulus is measured in accordance with JIS K7171 (distance between supporting points: 64 mm, support at two supporting points with a curvature radius of 5 mm, curvature radius of point of application: 5 mm, load application rate: 2 mm/min).

<8> Production of Thermoplastic Resin

The method for producing the thermoplastic resin that forms the vibration absorbing material according to the present invention is not limited. For example, the thermoplastic resin according to the present invention can be produced by the method disclosed in JP 2013-147645 A, JP 2013-147648 A or the like, and obtained by melt-kneading a polyolefin resin and a melt-kneaded product of a polyamide resin and a modified elastomer. The preparation of the melt-kneaded product and the melt-kneading of the melt-kneaded product and a polyolefin resin may be performed using a melt-kneading device. Examples of the melt-kneading device include an extruder (e.g., a single-screw extruder, a twin-screw melt-kneading extruder), a kneader, and a mixer (e.g., a high-speed flow mixer, a paddle mixer, a ribbon mixer).

The melt-kneading temperature for the polyamide resin and the modified elastomer is not limited. This temperature can be, for example, 190° C. or higher and 350° C. or lower, and is preferably 200° C. or higher and 330° C. or lower, more preferably 205° C. or higher and 310° C. or lower. Further, the melt-kneading temperature for the obtained melt-kneaded product and the polyolefin resin is not limited. This temperature can be, for example, 190° C. or higher and 350° C. or lower, and is preferably 200° C. or higher and 300° C. or lower, more preferably 205° C. or higher and 260° C. or lower.

EXAMPLES

Hereinafter, the present invention will be specifically described with reference to examples.

[1] Preparation of Molding Material Containing Thermoplastic Resin

Example 1

(1) Thermoplastic Resin

Pellets of the following polyamide resin and pellets of the following modified elastomer were dry-blended, then fed into a twin-screw melt-kneading extruder, and melt-kneaded at a kneading temperature of 210° C. The thus obtained melt-kneaded product of the polyamide resin and the modified elastomer was pelletized by a pelletizer to obtain pellets of the melt-kneaded product. Further, the pellets (pellets of the melt-kneaded product of the polyamide resin and the modified elastomer) and pellets of the following polyolefin resin were dry-blended, then fed into a twin-screw melt-kneading extruder, melt-kneaded at a kneading temperature of 210° C., and pelletized by a pelletizer to obtain pellets of a thermoplastic resin.

(a) Polyolefin resin: polypropylene resin, homopolymer, manufactured by Japan Polypropylene Corporation, product name: "NOVATEC MA1B", weight-average molecular weight: 312,000, melting point: 165° C.

(b) Polyamide resin: Polyamide 11 resin, manufactured by Arkema K. K., product name "Rilsan BMN O", weight-average molecular weight: 18,000, melting point: 190° C.

(c) Modified elastomer: maleic anhydride-modified ethylene-butene copolymer (modified EBR), manufactured by Mitsui Chemicals, Inc., product name: "TAFMER MH7020"

The mass blending ratio of the polyolefin resin, the polyamide resin, and the modified elastomer of the obtained thermoplastic resin was 55:25:20. The thermoplastic resin having such a mass ratio had a phase structure (1) (see FIG. 1).

(2) Molding Material

The pellet obtained in above (1) was charged into an injection molding machine (40 ton injection molding machine manufactured by Nissei Plastic Industrial Co., Ltd.) and a molding material according to Example 1 was injection molded under injection conditions of a set temperature of 210° C. and a mold temperature of 40° C. The molding material was molded into a predetermined shape for conducting an evaluation test which will be described later.

Example 2

In the same manner as in Example 1 above, a molding material according to Example 2 was prepared. Specifically, pellets of a thermoplastic resin of Example 2 were obtained using the same types of polyolefin resin, polyamide resin and modified elastomer as in Example 1 in the same procedures as in Example 1. The obtained thermoplastic resin was used to injection mold a molding material under the same conditions as in Example 1.

The mass blending ratio of the polyolefin resin, the polyamide resin, and the modified elastomer of the thermoplastic resin according to Example 2 was 32.5:42.5:25. The thermoplastic resin according to Example 2 had a phase structure (2) (see FIG. 2).

Comparative Example 1

As Comparative Example 1, pellets of the following polyolefin resin were used to injection mold a molding material under the same conditions as in Example 1.

(a) Block copolymer of polyolefin resin: Polypropylene resin, block polymer, manufactured by Prime Polymer Co., Ltd., product name "J-452HP"

[2] Evaluation Test

Figure 3:
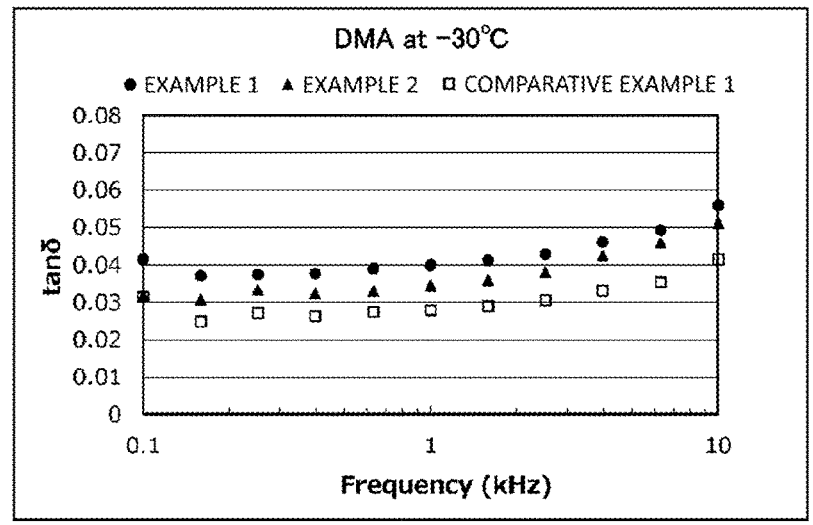
FIG. 3 is a graph showing evaluation test results of a tan δ value at −30° C. in the present example.
Figure 4:
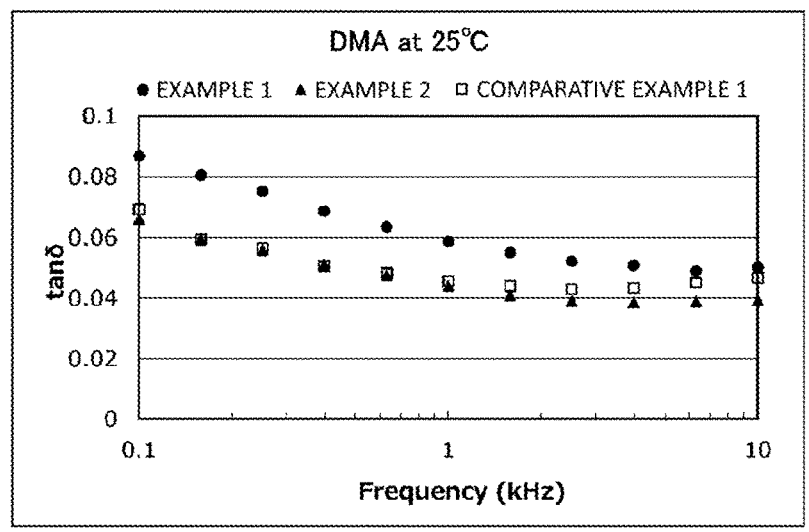
FIG. 4 is a graph showing evaluation test results of the tan δ value at 25° C. in the present example.
Figure 5:
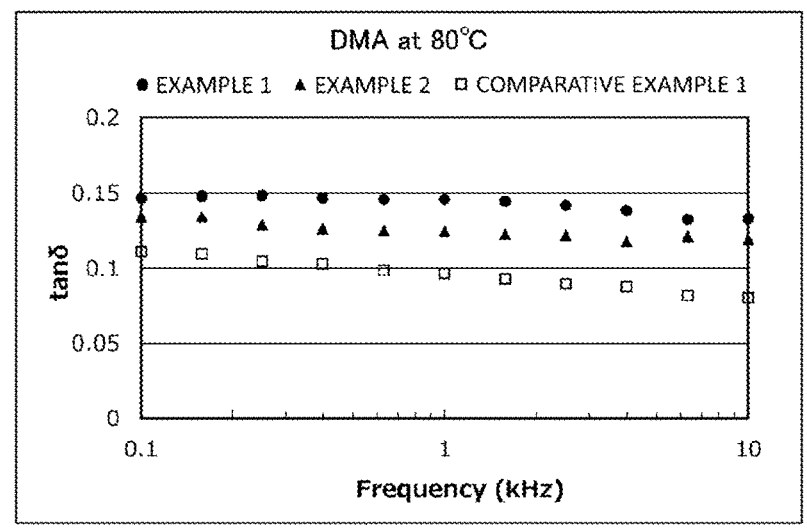
FIG. 5 is a graph showing evaluation test results of the tan δ value at 80° C. in the present example.

A test specimen for an evaluation test was cut out from the molding material of Example 1 or 2 or Comparative Example 1 molded in the above [1] to measure the solid dynamic viscoelasticity. That is, according to the following conditions, a predetermined sinusoidal strain of a specific frequency was applied to the test specimen in the tension mode, and the generated stress was detected. From the obtained stress, the storage elastic modulus E' and the loss elastic modulus E" were obtained by a known method, and the tan δ (dumping coefficient) defined by the ratio of the two elastic moduli was calculated (=loss elastic modulus E"/storage elastic modulus E'). The correlation between the measurement frequency and the tan δ is shown in FIGS. 3 to 5 for each measurement temperature. In addition, "DMA" in FIGS. 3 to 5 means the measurement of solid dynamic viscoelasticity.

(a) Device: RSA-III (manufactured by TA Instruments)
    (b) Test specimen shape: Strip shape (width 4 mm×length 30 mm×thickness 1 mm)
    (c) Strain amplitude: 0.1(%)
    (d) Deformation mode: Tension
    (e) Measurement frequency: 0.1 to 10 kHz
    (f) Measurement temperature: −30° C., 25° C., 80° C.
    (g) Temperature rise rate: 3° C./min

[3] Effects of Examples (a. Vibration Absorbing Material)

The molding materials according to Examples 1 and 2 contained homopolypropylene as the polyolefin resin, polyamide 11 as the polyamide resin, and maleic anhydride-modified EBR as the modified elastomer. When the total of the polyolefin resin, the polyamide resin, and the modified elastomer was 100% by mass, the proportion of the polyolefin resin was 55% by mass, the proportion of the polyamide resin was 25% by mass, and the proportion of the modified elastomer was 20% by mass in the molding material of Example 1. In the molding material of Example 2, the proportion of the polyolefin resin was 32.5% by mass, the proportion of the polyamide resin was 42.5% by mass, and the proportion of the modified elastomer was 25% by mass. The molding materials of Examples 1 and 2 were molded from a thermoplastic resin having a continuous phase (A) containing a polyolefin resin and a dispersed phase (B) dispersed in the continuous phase (A) and containing a polyamide resin.

From the results of the evaluation tests shown in FIGS. 3 to 5, it was found that the tan δ value of the molding material using the thermoplastic resin according to Example 1 was about 1.42 times larger, on average, than that of Comparative Example 1. Similarly, in Example 2, it was found that the tan δ value was about 1.18 times larger, on average, than that of Comparative Example 1. The "average" is based on a numerical value obtained for all the tan δ values of each Example or Comparative Example at each measurement temperature and each measurement frequency.

Further, the thermoplastic resin for molding the molding material of Comparative Example 1 has a sea-island structure having a continuous phase of homopolypropylene and a dispersed phase of polyethylene (ethylene block) dispersed in the continuous phase. It has a phase structure having an EPR rubber phase at the periphery of the ethylene block, that is, at the boundary between the continuous phase and the dispersed phase. Therefore, Example 1 has a phase structure similar to that of Comparative Example in that it has a sea-island structure having a homopolypropylene resin as a continuous phase. However, even though having the same phase structure, the molding material according to Example 1 had a larger tan δ value than that of the molding material of Comparative Example 1 at each measurement temperature and in the entire range of measurement frequency.

That is, from the fact that the molding material according to Example 1 was superior in damping properties to Comparative Example 1, it was found that the molding material has a greater potential as a vibration absorbing material than Comparative Example 1. Such a correlation tendency between the measurement frequency and the tan δ value was similarly observed in Example 2, although the tan δ value was generally smaller than that of Example 1 by about 0.013 on average. Therefore, it was found that Example 2 also has a potential as a vibration absorbing material as in Example 1.

The measurement frequency of 0.1 to 10 kHz at which the above evaluation test was conducted is included in the frequency band (20 Hz to 20 kHz) which is the human audible band. Based on the test results in which the function of absorbing vibration was superior to that of the comparative example within the measurement frequency range of 0.1 to 10 kHz, the molding materials of Examples 1 and 2 were found to have properties suitable for use as vibration absorbing materials reducing the noise felt by humans. The molding materials of the examples are originally materials well known as synthetic resins having mechanical strength. In addition, the molding materials of the examples showed a tan δ value superior to that of the comparative example similarly having a sea-island phase structure. In view of these facts, it is considered that the molding materials of the examples have an attribute suitable as materials for absorbing vibration in the range of 0.1 to 10 kHz, which is a new feature of the molding material according to the present invention.

(b. Automotive Interior/Exterior Applications)

Here, the range of the measurement frequency at which the measurement was made in the above examples encompasses a frequency band known as noise that reaches a human in the passenger compartment due to traveling of the automobile. Specifically, it is known that the noise that humans perceive in the passenger compartment of the automobile corresponds to a low frequency band of about 0.1 to 3 kHz. More specifically, the "engine sound" is a complex periodic sound according to the engine speed, and the main frequency band is about 2 kHz. "Booming noise" is a noise pressing the ears, which is felt by humans in the passenger compartment, and is a low-frequency noise having a main frequency band of about 0.02 to 0.25 kHz. "Vibration noise" is a noise generated upon contact between the road surface and the tire, and has a main frequency band of 1 kHz or less. "Wind noise" is a random noise generated by the disturbance of airflow around the vehicle due to high-speed traveling of the automobile, and belongs to a frequency band up to around 3 kHz.

From FIGS. 3 to 5, only in the case of FIG. 4, there was a tendency that, at 25° C. which is close to the passenger compartment temperature, the vibration absorbing material of Example 2 had a tan δ value below the tan δ value of the comparative example at that time when the frequency was higher than 3 kHz. However, it was found that the vibration absorbing materials of Examples 1 and 2 exhibited a good tan δ value in comparison with the comparative example, in a low frequency band of about 0.1 to 3 kHz at 25° C. and in the entire bands of the measurement frequencies at −30° C. and 80° C.

Further, from FIG. 4, it was found that, in the vibration absorbing material of Example 1, the tan δ value at 25° C., which is close to the passenger compartment temperature, was generally larger than 0.06 in a low frequency band of 0.1 to 1 kHz, larger than 0.07 in an ultra-low frequency band of 0.1 to 0.4 kHz, and increased to about 0.09 as it further approached the ultra-low frequency side of 0.1 to 0.2 kHz.

Conventionally, it is known that the tan δ value of a rubber material used in vibration-proof rubber is about 0.1. The vibration absorption performance of the vibration absorbing materials of Examples 1 and 2 was found to be as good as the rubber material in an ultra-low frequency band of 0.1 to 1 kHz, preferably 0.1 to 0.4 kHz, more preferably 0.1 to 0.2 kHz at around a normal passenger compartment temperature of about 25° C.

From the above, the vibration absorbing materials of Examples 1 and 2 were found to be excellent vibration absorbing materials for suppressing noise in a low frequency band up to around 3 kHz, which is conscious of humans in the passenger compartment of an automobile, based on the comparison with the molding material of the comparative example. Further, the vibration absorbing materials of Examples 1 and 2 are as good as the rubber materials used in the vibration-proof rubber as vibration absorbing materials for suppressing noise particularly in an ultra-low frequency band up to around 1 kHz. Therefore, it was found that the vibration absorbing material according to the present invention is particularly suitable as a material for molding the interior/exterior material for an automobile having a vibration absorbing function.

In this way, the use of the vibration absorbing material according to the present invention as an interior/exterior material for an automobile is based on the attribute of fulfilling the function of satisfactorily absorbing vibrations corresponding to noise in the low frequency band up to around 3 kHz, especially noise in the ultra-low frequency band up to 1 kHz. In addition, the attribute that the interior/exterior material for an automobile itself performs a vibration absorbing function enough not to require vibration-proof rubber provides a novel use different from the conventionally known use in view of the fact that the vibration absorbing material according to the present invention is originally a better synthetic resin material having a greater mechanical strength (rigidity) than rubber materials.

Specific examples of interior/exterior materials are not particularly limited, and can include floor carpets, door trims, various panels, various pillars, bumpers, fender liners, engine covers, tonneau covers, package trays, silencers, air cleaners used in engine intake systems, intake manifolds, and cylinder head cover, in which vibration absorbing materials are used.

(c. Phase Structure)

Further, as shown in FIG. 1, the vibration absorbing material of Example 1 has a phase structure (1) in which the thermoplastic resin includes the continuous phase (A) containing the polyolefin resin and the dispersed phase (B) dispersed in the continuous phase (A) and containing a polyamide resin, and, further, the dispersed phase (B) has the continuous phase (Ba) in the dispersed phase containing a polyamide resin and the fine dispersed phase (Bb) dispersed in the continuous phase (Ba) in the dispersed phase and containing a modified elastomer.

When the vibration absorbing material has the phase structure (1) according to Example 1, the vibration absorbing material has the fine dispersed phase (Bb), and thus represents a multiple phase structure. In general, when stress is applied to a thermoplastic resin containing different kinds of polymers, it is considered that the stress tends to concentrate at the boundary between the different kinds of polymers. In the phase structure (1), in addition to the periphery (boundary surface) of the dispersed phase (B) and the continuous phase (A), also on the periphery (boundary surface) of the continuous phase (Ba) in the dispersed phase and the fine dispersed phase (Bb), the modified elastomer capable of absorbing vibration energy exists in the form of paste, and thus it is considered that the vibration absorbing ability can be more effectively enhanced over a wide range.

The vibration absorbing material of Example 2 has, as shown in FIG. 2, a phase structure (2) in which, in addition to the continuous phase (A), the thermoplastic resin includes a second continuous phase (A2) coexisting with the continuous phase (A) and containing the polyamide resin, and the second continuous phase (A2) has a second dispersed phase (B2) dispersed in the second continuous phase (A2) and containing the modified elastomer.

When the vibration absorbing material has the phase structure (2) according to Example 2, the thermoplastic resin includes the second continuous phase (A2) coexisting with the continuous phase (A), and has a phase structure in which the continuous phase (A) includes the dispersed phase (B) having the continuous phase (Ba) in the dispersed phase and the fine dispersed phase (Bb), and the second continuous phase (A2) includes the second dispersed phase (B2). Therefore, also in the case of the phase structure (2), it is considered that the vibration absorbing ability can be more effectively enhanced over a wide range as in the phase structure (1).

In the above phase structures (1) and (2), when the dispersed phase (B) in the continuous phase (A) has the continuous phase (Ba) in the dispersed phase and the fine dispersed phase (Bb), it is highly probable that the average dispersion diameter of the dispersed phase (B) may be 100 nm or more and 4000 nm or less, and that the average dispersion diameter of the fine dispersed phase (Bb) may be 15 nm or more and 350 nm or less. In this case, it is considered that the uniform dispersibility of the dispersed phase (B) and the fine dispersed phase (Bb) is ensured, so that the vibration absorbing ability is more reliably enhanced over a wide range.

The foregoing examples are for illustrative purposes only and are in no way to be construed as limiting of the present invention. For example, the vibration absorbing material may contain a mixed resin obtained by further adding a polyolefin resin to the above-described thermoplastic resin according to the examples.

In this case, the method for obtaining a mixed resin by further adding another polyolefin resin to the above-described thermoplastic resin according to the embodiment originally containing the polyolefin resin is not particularly limited, and melted resins may be mixed in a wet manner, or pellet-shaped solid resin raw materials may be mixed in a dry manner. Further, the thermoplastic resin may be any thermoplastic resin as long as it contains the above-described predetermined component resins in predetermined component proportions and has a predetermined phase structure. For example, an end material of a used vibration absorbing material may be crushed and used as a thermoplastic resin raw material, or may contain a mixed resin obtained by adding a polyolefin resin to this end material. When the vibration absorbing material contains such a mixed resin, the uniform dispersibility of the dispersed phase in the thermoplastic resin component is further enhanced, and therefore the dispersibility of the stress concentration portion is also enhanced. Therefore, it is considered that the vibration absorbing function can be improved.

The vibration absorbing materials shown in the examples were obtained through a processing form in which solid molding was performed, but the thermoplastic resin according to the present invention is known to be suitable for processing into various forms such as a foamed molded body (WO2017/155114), a reinforced fiber resin molded body (JP 2018-123284 A), and a fiber (JP 2018-123457 A). The ability of the vibration absorbing material containing the thermoplastic resin according to the present invention to absorb vibration is not specified as the tan δ values shown in the examples, and has a potential to further increase the tan δ value for each processing form.

As described in detail above, a novel use as a vibration absorbing material, which is a molding material having a certain mechanical strength as a structural material and which exhibits excellent vibration absorbing ability by itself as a molding material containing a thermoplastic resin, could be found.

In addition, by clarifying the attributes that the interior/exterior material for an automobile itself performs a vibration absorbing function comparable to that of vibration-proof rubber, a novel use of the vibration absorbing material according to the present invention could be found.

The invention directed to the vibration absorbing material is also understood as an invention of a novel method of using the thermoplastic resin. Specifically, the present invention relates to a method of using a thermoplastic resin, the thermoplastic resin containing a polyolefin resin, a polyamide resin, and a modified elastomer having a reactive group that reacts with the polyamide resin, wherein, when the total of the polyolefin resin, the polyamide resin and the modified elastomer is 100% by mass, the proportion of the polyolefin resin is 10% by mass or more and 90% by mass or less, the proportion of the polyamide resin is 3% by mass or more and 85% by mass or less, and the proportion of the modified elastomer is 3% by mass or more and 35% by mass or less, and wherein the thermoplastic resin including a continuous phase (A) containing the polyolefin resin and a dispersed phase (B) dispersed in the continuous phase (A) and containing the polyamide resin is used as a vibration absorbing material.

The method of using this thermoplastic resin makes it possible to use the thermoplastic resin as a vibration absorbing material. A molding material using this thermoplastic resin can exhibit excellent vibration absorption ability by itself as a molding material having a certain mechanical strength as a structural material. As described above, according to the present invention, a novel method of using this thermoplastic resin, which is different from the conventionally known method of using a thermoplastic resin as a structural material, could be found.

While the present invention has been described with reference to exemplary embodiments, it is understood that the words which have been used herein are words of description and illustration, rather than words of limitation. As described in detail herein, modification may be made to the embodiments within the scope of the appended claims without departing from the scope and spirit of the present invention. Although the present invention has been described herein with reference to particular structures, materials, and examples, the present invention is not intended to be limited to the particulars disclosed herein; rather, the present invention extends to all functionally equivalent structures, methods, and uses, which are within the scope of the appended claims.

The invention claimed is:

1. A noise reducing method, the method comprising:
preparing a vibration absorbing material,
wherein the vibration absorbing material comprises a polyolefin resin, a polyamide resin, and an elastomer having a reactive group that is capable of reacting with the polyamide resin,
wherein the total of the polyolefin resin, the polyamide resin and the elastomer in the vibration absorbing material is 100% by mass, where the polyolefin resin content is in a range of from 10% by mass or more and 90% by mass or less, the polyamide resin content is in a range of from 3% by mass or more and 85% by mass or less, and the elastomer content is in a range of from 3% by mass or more and 35% by mass or less, and
wherein the vibration absorbing material comprises a thermoplastic resin including a continuous phase (A) comprising the polyolefin resin and a dispersed phase (B) dispersed in the continuous phase (A) and comprising the polyamide resin;
molding the vibration absorbing material to obtain an interior material;
applying the interior material to an automobile; and
reducing noise in a range of from 20 Hz to 20 kHz while traveling in the automobile.

2. The noise reducing method according to claim 1, wherein the dispersed phase (B) has a continuous phase (Ba) in the dispersed phase comprising the polyamide resin, and a fine dispersed phase (Bb) dispersed in the continuous phase (Ba) in the dispersed phase and comprising the elastomer.

3. The noise reducing according to claim 2, wherein an average dispersion diameter of the dispersed phase (B) is 100 nm or more and 4000 nm or less, and an average dispersion diameter of the fine dispersed phase (Bb) is 15 nm or more and 350 nm or less.

4. The noise reducing method according to claim 1, wherein, in addition to the continuous phase (A), the thermoplastic resin includes a second continuous phase (A2) coexisting with the continuous phase (A) and comprising the polyamide resin, and
wherein the second continuous phase (A2) has a second dispersed phase (B2) dispersed in the second continuous phase (A2) and comprising the elastomer.

5. The noise reducing method according to claim 1, wherein the interior material is selected from the group consisting of floor carpets, door trims, bumpers, fender liners, engine covers, tonneau covers, and package trays.

* * * * *